J. Swartz.

Mower.

No. 1313 Reissued Jun. 3, 1862.

Witnesses.

Geo. H. Harrison.

Wm. H. Bates.

Inventor.

Jacob Swartz by atty.

Andrew Whiteley.

UNITED STATES PATENT OFFICE.

JACOB SWARTZ, OF BUFFALO, NEW YORK.

IMPROVEMENT IN HARVESTERS.

Specification forming part of Letters Patent No. 11,951, dated November 14, 1854; Reissue No. 970, dated June 5, 1860; Reissue No. 1,313, dated June 3, 1862.

DIVISION A.

*To all whom it may concern:*

Be it known that I, JACOB SWARTZ, of the city of Buffalo, in the county of Erie and State of New York, have invented new and useful Improvements in Grain and Grass Harvesters, of which the following is a full, clear, and exact description of the parts thereof requisite for a proper understanding of such of said improvements as are herein claimed, reference being had to the accompanying drawings, forming part of this specification, in which—

Figure 1:
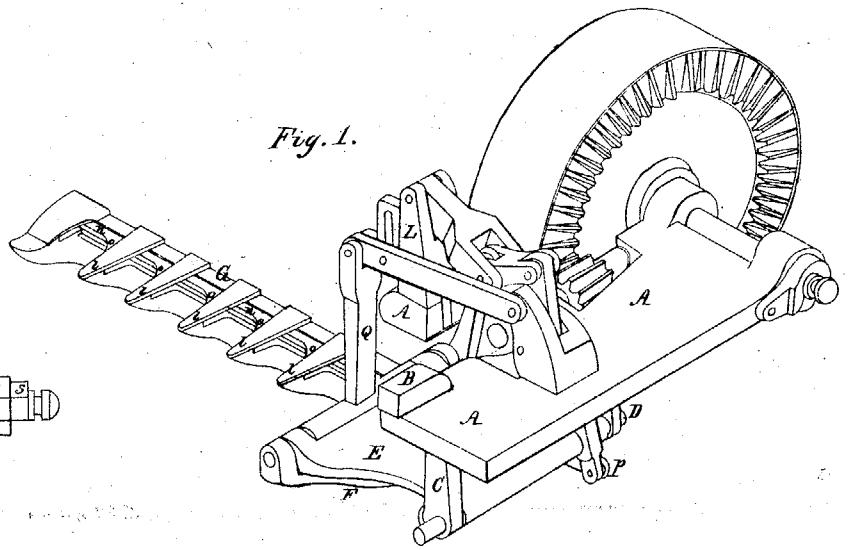
Figure 3:
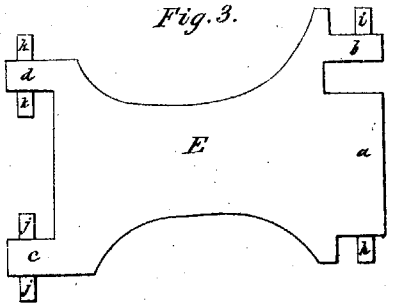
Figure 2:
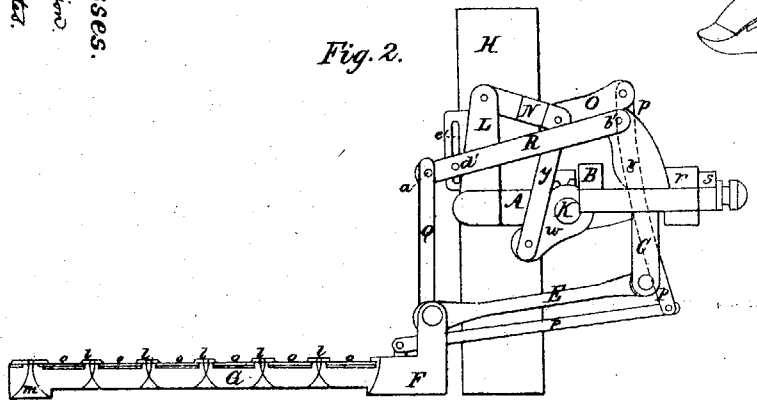
Figure 4:
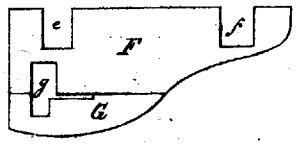

Figure 1 represents in perspective a side-cutting harvester embracing my improvements, certain parts only of which are herein claimed. Fig. 2 represents a front view of the same with the bottom of the shoe and divider on the same horizontal line or resting on the common surface of the ground when the fingers are a little above it, which enables them to pass over small elevations of the surface, &c., without raising either the shoe or divider from the ground. Fig. 3 represents a top view of the coupling-arm and hinge-pins which connect it to the hangers and the shoe to the arm; and Fig. 4 represents a side-view of my improved shoe with the cavities therein for the branches of the coupling-arm, and in and between it and the finger-bar a guideway for the heel of the cutter-bar, and a slot for the cutters. This shoe, as shown, with its connections, is hinged to the coupling-arm; but the improvement claimed in this division has no reference to a hinged connection of said arm with the main frame, that improvement being made the subject of another division.

The finger-bar which I use is of the short laterally-projecting class, and of that class which has no other connection with the main frame of the machine than that derived through the shoe at its inner end or heel; and the improvement claimed under this patent consists in connecting the shoe which sustains the finger-bar, and which has its front end sloped forward and upward until it is sufficiently forward of and above the points of the fingers to pass over the cut crop without dragging it, and which is of sufficient width, and has in and between it and the finger-bar a guideway for the heel of the cutter-bar when reciprocating its cutters in straight lines to said main frame through the medium of a hinge-connection. My shoe and the fingers and divider which I use have at the front edge of the finger-bar slots, through which a scalloped cutter is reciprocated in a straight line. That end of the finger-bar which is connected to the shoe and terminates at or near its inner edge I call the "inner end" or "heel," and that end to which the divider is connected, and which runs next to the uncut crop, I call the "outer end."

Of the parts herein specified, A represents the main frame of the machine, by which the other parts are supported and drawn forward; B, the tongue by which it is drawn forward; C D, two hangers extending some distance below the frame, in the lower end of each of which there is a hole in line with each other and with or nearly with the path of the machine; E, the coupling-arm, through the branches of each end of which is a horizontal hole for the hinge-pins, which hold it and the finger-bar (the shoe and divider at the ends of which follow all the ordinary undulations of the ground) about at right angles to the path of the machine; *a*, the front branch of the end of the coupling-arm, which is connected to the hangers C and D; *b*, the rear branch of the same end; *c*, the front branch of the vibrating end, and *d* the rear branch of the same end; F, the shoe through which the finger-bar receives all its connection with the main frame of the machine; *e* and *f*, cavities in said shoe for receiving the branches *c* and *d*; *g*, the guideway in and between the shoe and finger-bar for the heel of the cutter-bar, and a slot through which the cutters pass into the fingers and dividers; *h*, the hinge-pin which couples branch *a* to hanger C; *i*, that which couples branch *b* to hanger D; *j*, that which couples the front end of shoe F to branch *c*, and *k* that which couples its rear end to branch *d*; G, the finger-bar; *l l l l l* its fingers, and *m* the divider on its outer end; *n*, the cutter-bar; *o o o o o o*, the cutters secured thereto, and *p* the pitman through which they receive their reciprocatory motion.

H represents the main ground and driving wheel, which carries the main frame and gives motion to the cutters; I, its axle, fast in it; *s*, the drop-clutch by which the main driving coggear is held in or out of gear with its pinion J on its shaft K, which revolves in its boxes *t* and *u*. L and M represent two posts extending above the frame. To the upper end of L is hinged one end of a toggle-lever, N, to the other end of which is hinged one end of a toggle-lever, O, whose other end is hinged to the upper end of a vibrating lever, P, which is pivoted at *v* to post M, and has its lower end hinged to pitman *p*. On the end of shaft K is placed a crank, *w*, in which is inserted a wrist-pin, on which is placed the lower end of a connecting-rod or pitman, *y*, through the upper end of which passes the hinge-pin, which connects the toggle-levers N and O together.

It will be seen that by the arrangement of parts just described the cutters will receive two motions each way during every revolution of shaft K.

Q represents the post which extends up from shoe F to arm R; *a'*, the hinge-pin which connects its upper end with arm R, whose other end is hinged to post M by hinge-pin *b'*; *c'*, the vertical guide-slot in post L, through which the set-screw *d'* passes into arm R, which parts limit the extent of the vertical vibration of the inner end of the cutting apparatus toward and from the main frame to the length of slot *c'*; but their operation need not be further described in this division, as it is fully described in another filed simultaneously herewith.

In order to properly balance the machine and prevent side draft therein, (which is my design,) it may be necessary to place the tongue between the wheel and shoe. To do this the main frame's width and the coupling-arm's length require to be increased so much that the animal between the tongue and standing crop will not walk on the standing crop.

I do not wish to be understood as claiming the invention of a shoe possessing the following characteristics only: first, whose inner edge terminates at or near the inner end or heel of a finger-bar which derives all its connection with the main frame through the shoe; second, whose outer edge forms part of the cutting apparatus; third, which, in connection with the finger-bar, serves as a guideway for the heel of a cutter-bar when reciprocating its cutters across the fingers in straight lines; and, fourth, whose front end is sloped forward and upward until it is sufficiently above the points of the fingers for passing over the cut crop, as I am aware that shoes have been used previous to my invention which performed all those functions; but I am not aware that previous to my invention a shoe which performed all of said functions was also hinged to the main frame of a harvester. Therefore I do not wish to be understood as limiting myself to the particular manner of constructing and connecting said shoe to the main frame of the machine shown, as said mode of connection involves an improvement claimed in another division of my invention, shown and described in my original patent; but

What I claim under this patent is—

In combination with the main frame of a harvester and a short laterally-projecting finger-bar carrying cutters reciprocating in a straight line, a shoe whose front end is sloped forward and upward above the points of the fingers, substantially as shown, through which said finger-bar receives all its connection with the main frame of the machine, when said shoe is secured to the main frame through the medium of a hinge-connection.

JACOB SWARTZ.

Witnesses:
JAMES GUNN,
ABRAM S. SWARTZ.